(12) United States Patent
Udaka et al.

(10) Patent No.: US 6,876,412 B2
(45) Date of Patent: *Apr. 5, 2005

(54) GUEST-HOST LIQUID CRYSTAL ELEMENT WITH REMOVABLE POLARIZER

(75) Inventors: Toru Udaka, Kanagawa (JP); Keiichi Nito, Tokyo (JP); Toshiharu Yanagida, Tokyo (JP); Masaru Kawabata, Tokyo (JP)

(73) Assignee: Sony Corporation, Tokyo (JP)

( * ) Notice: Subject to any disclaimer, the term of this patent is extended or adjusted under 35 U.S.C. 154(b) by 7 days.

This patent is subject to a terminal disclaimer.

(21) Appl. No.: 10/297,304

(22) PCT Filed: Apr. 5, 2002

(86) PCT No.: PCT/JP02/03450

§ 371 (c)(1),
(2), (4) Date: May 23, 2003

(87) PCT Pub. No.: WO02/082175

PCT Pub. Date: Oct. 17, 2002

(65) Prior Publication Data

US 2004/0012753 A1 Jan. 22, 2004

(30) Foreign Application Priority Data

Apr. 6, 2001 (JP) ........................ 2001-108271

(51) Int. Cl.[7] ........................................... G02F 1/1335
(52) U.S. Cl. ........................... 349/96; 349/56; 349/165
(58) Field of Search ........................... 349/56, 96, 165

(56) References Cited

U.S. PATENT DOCUMENTS 4,728,173 A * 3/1988 Toth .......................... 349/14
5,488,496 A * 1/1996 Pine .......................... 349/96
5,764,412 A * 6/1998 Suzuki et al. ................ 359/487
5,986,729 A * 11/1999 Yamanaka et al. ............. 349/79
6,456,345 B1 * 9/2002 Ise .............................. 349/96
6,486,928 B1 * 11/2002 Lin et al. ...................... 349/16
6,529,253 B1 * 3/2003 Matsute ....................... 349/96
6,720,742 B2 * 4/2004 Yanagida et al. ........... 315/291

FOREIGN PATENT DOCUMENTS

| JP | 56-57026 | 5/1981 |
|---|---|---|
| JP | 56-115123 | 9/1981 |
| JP | 61-4927 | 1/1986 |
| JP | 61-94819 | 6/1986 |
| JP | 62-124526 | 6/1987 |
| JP | 62-116226 | 7/1987 |
| JP | 5-173127 | 7/1993 |
| JP | 6-317765 | 11/1994 |
| JP | 8-171089 | 7/1996 |
| JP | 9-292634 | 11/1997 |
| JP | 11-133231 | 5/1999 |
| JP | 2000-180839 | 6/2000 |

* cited by examiner

*Primary Examiner*—Andrew Schechter
(74) *Attorney, Agent, or Firm*—Frommer Lawrence & Haug LLP; William S. Frommer

(57) ABSTRACT

A light control device and an imaging device suitable for the effective and stabilized driving of a Guest-Host type liquid crystal element. A light control device (23) which is provided with a light controlling GH cell (12) and a UV cut filter (65) provided on the light incident side of the GH cell (12), and which is therefore reduced significantly in the quantity of ultraviolet ray applied to the GH cell (12), thereby preventing the photodecompositon or photodegradation of materials constituting a liquid crystal layer in the GH cell (12); and an imaging device such as a CCD camera (50) having this light control device disposed on the optical path thereof.

4 Claims, 16 Drawing Sheets

US 6,876,412 B2

GUEST-HOST LIQUID CRYSTAL ELEMENT WITH REMOVABLE POLARIZER

TECHNICAL FIELD

The present invention relates to a light control device, for example, for controlling the quantity of incident light and emitting the light, and an imaging device using the light control device.

BACKGROUND ART

In general, a polarizer plate is used for a light control device using a liquid crystal cell. As the liquid crystal cell, for example, a TN (Twisted Nematic) liquid crystal cell or a guest-host (GH) liquid crystal cell is used.

FIGS. 15A and 15B are schematic drawings each showing the principle of operation of a conventional light control device. The light control device mainly comprises a polarizer 1 and a GH cell 2. Although not shown in the drawings, the GH cell 2 is sealed between two glass substrates, and comprises an operating electrode made of ITO (Indium tin oxide) or the like, and a liquid crystal orientation film such as a polyimide film or the like (this applies to the description below). Also, a positive liquid crystal molecule 3 and a positive dichroic dye molecule 4 are sealed in the GH cell 2.

The positive dichroic dye molecule 4 has anisotropy of light absorption, and is, for example, a positive (p-type) dye molecule which absorbs light in the long-axis direction of the molecule. The positive liquid crystal molecule 3 has, for example, positive anisotropy of dielectric constant.

FIG. 15A shows the state (no-voltage-applied state) of the GH cell 2 with no voltage applied. Incident light 5 is transmitted through the polarizer 1 to be linearly polarized. In FIG. 15A, the polarization direction coincides with the molecular long-axis direction of the positive dichroic dye molecule 4, and thus light is absorbed by the positive dichroic dye molecule 4 to decrease the light transmittance of the GH cell 2.

As shown in FIG. 15B, with the voltage applied to the GH cell 2, the positive liquid crystal molecule 3 is oriented in the direction of an electric field, and thus the molecular long-axis direction of the positive dichroic dye molecule 4 is perpendicular to the polarization direction of linearly polarized light. Therefore, the incident light 5 is transmitted through the GH cell 2 with substantially no absorption by the GH cell 2.

In the GH cell 2 shown in FIGS. 15A and 15B, mean light transmittance (based on light transmittance (=100%) in the air when a polarizer is added to a liquid crystal cell; this applies to the description below) of visible light increases with application of an operating voltage, as shown in FIG. 16. However, when the voltage is increased to 10 V, the maximum light transmittance is about 60%, and the light transmittance slowly changes.

In the use of a negative (n-type) dichroic dye molecule which absorbs light in the molecular short-axis direction and which is converse to the positive dichroic dye molecule 4, light is not absorbed with no voltage applied, while light is absorbed with the voltage applied.

In the light control device shown in FIGS. 15A and 15B, the ratio of absorbance with the voltage applied to absorbance with no voltage applied, i.e., the optical density ratio, is about 10. Therefore, the light control device has an optical density ratio of about 2 times as high as the ratio of a light control device comprising only the GH cell 2 without the polarizer 1.

In the use of a conventional guest-host liquid crystal cell, a dichroic dye molecule is used in a liquid crystal element, and there is thus the problem of deteriorating the dye molecule by excessive ultraviolet irradiation.

Namely, ultraviolet light is incident on the light control device from the outside through an effective optical path of an imaging device, and the dichroic dye molecule contained in the guest-host liquid crystal element is ionized (changed in physical properties) by optical decomposition or deterioration due to the incident ultraviolet light. Therefore, the color of the molecule is changed or faded to deteriorate the light absorption function basically possessed by the molecule, thereby deteriorating the light absorption effect and the driving efficiency of the guest-host liquid crystal element.

Accordingly, an object of the present invention is to provide a light control device and an imaging device suitable for effective and stable drive of a guest-host liquid crystal element.

DISCLOSURE OF INVENTION

The present invention relates to a light control device comprising a guest-host liquid crystal element for controlling light, and a filter material provided on the light incidence side of the liquid crystal element, for absorbing at least ultraviolet rays.

The present invention also relates to an imaging device comprising a light control device which comprises a guest-host liquid crystal element for controlling light and which is disposed in an optical path of an imaging system, and a filter material disposed on the light incident side of the liquid crystal element, for absorbing at least ultraviolet rays.

The present invention also relates to a light control device comprising a guest-host liquid crystal element for controlling light, and at least one of a filter material absorbing at least ultraviolet rays and a reflecting material reflecting at least ultraviolet rays, which is disposed on the light incident side of the liquid crystal element.

The present invention furthermore provides an imaging device comprising a light control device which comprises a guest-host liquid crystal element for controlling light and which is disposed in an optical path of an imaging system, and at least one of a filter material absorbing at least ultraviolet rays and a reflecting material absorbing at least ultraviolet rays, which is disposed on the light incident side of the liquid crystal element.

In the present invention, at least one of the filter material absorbing at least ultraviolet rays and the reflecting material reflecting at least ultraviolet rays is disposed on the light incident side of the guest-host liquid crystal element, and thus the quantity of at least ultraviolet rays applied to the guest-host liquid crystal element is significantly decreased. Therefore, the component material such as the dichroic dye molecule in the guest-host liquid crystal element is neither optically decomposed nor optically deteriorated by ultraviolet rays, thereby permitting stable high-efficiency drive of the liquid crystal element.

BEST MODE FOR CARRYING OUT THE INVENTION

In the present invention, a filter material or a reflecting material comprises at least one selected from an ultraviolet cut-off or reflecting film, ultraviolet cut-off or reflecting coated glass, and ultraviolet absorbing or reflecting glass, and the filter material or the reflecting material is preferably provided at least in the same area as the section of an effective optical path of incident light, for sufficiently cutting off or reflecting ultraviolet rays.

Also, a polarizer is disposed in the effective optical path of light incident on a liquid crystal element so that the polarizer can be taken in and out of the effective optical path, for making a quantity of light uniform, as described below.

When the liquid crystal element is disposed to be exposed from the outer surface of a device, preferably, the filter material or the reflecting material is provided on the light incidence side of the liquid crystal element, and the filter material or the reflecting material is also provided on the side surface of the liquid crystal element.

The liquid crystal element is preferably a guest-host liquid crystal element using a negative or positive liquid crystal, particularly a negative liquid crystal, as a host material, and a positive or negative dichroic dye as a guest material, from the viewpoint of transmittance and response speed, as described below.

Preferred embodiments of the present invention will be described below with reference to the drawings.

Figure 1:
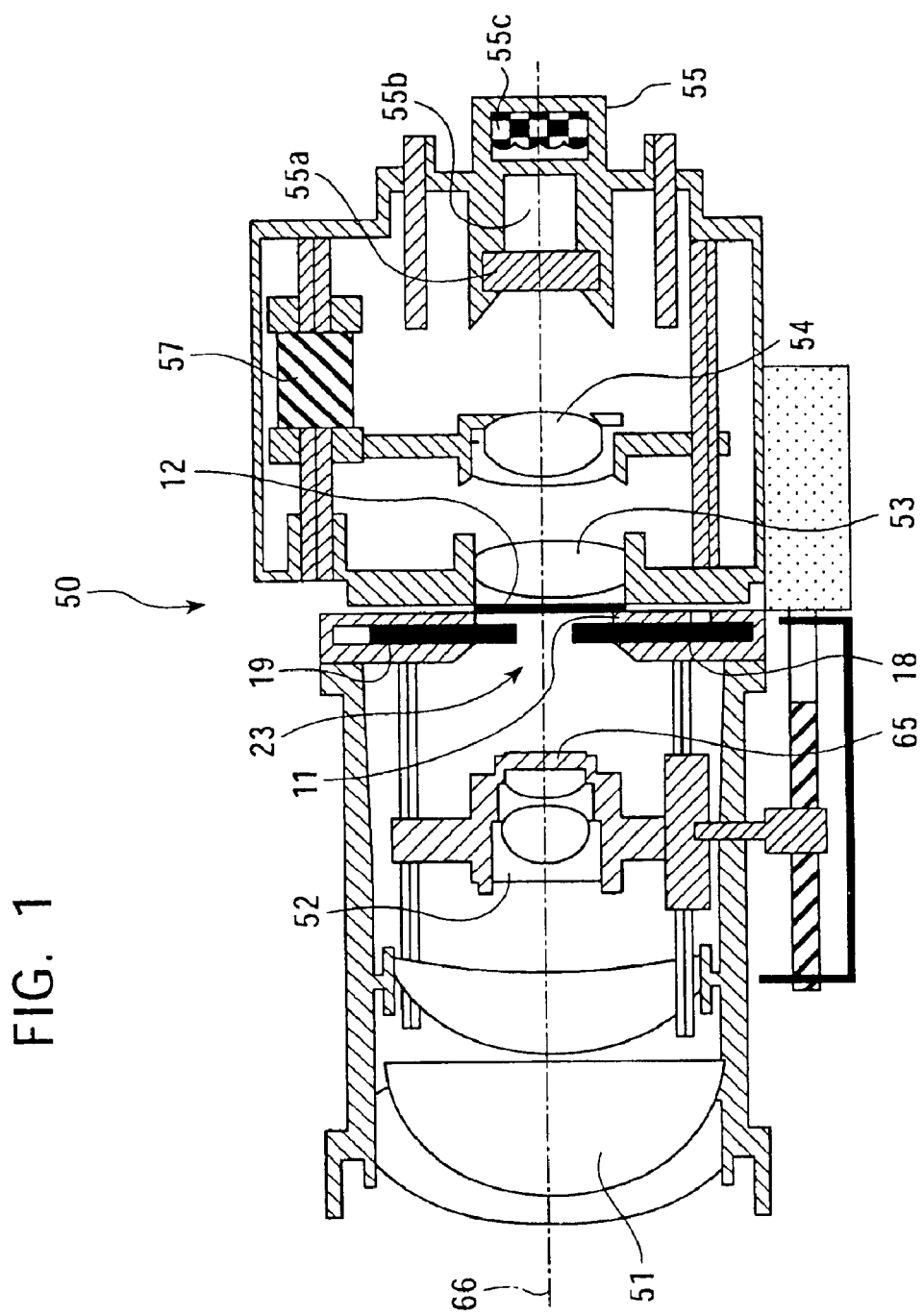
FIG. 1 is a schematic sectional view of a camera system in which a light control device is incorporated according to an embodiment of the present invention.

FIG. 1 shows an embodiment in which a light control device 23 is incorporated into a CCD (charge coupled device) camera 50.

Namely, in the CCD camera 50, a third lens group 53 and a fourth lens group (for focusing) 54, which correspond to a rear lens group 16, are provided along an optical axis 66 shown by a one-dot chain line, and an infrared cut-off filter 55a, an optical low-pass filter 55b and a CCD imaging element 55c are contained in a CCD package 55.

The light control device 23 comprising a GH cell 12 and a polarizer 11 is provided near the third lens group 53 between a second lens group (for zooming) 52 and the third lens group 53 on the same optical path, for controlling a quantity of light (decreasing a quantity of light). The fourth lens group 54 for focusing is disposed to be movable between the third lens group lens 53 and the CCD package 55 along the optical path by a linear motor 57. The second lens group 52 for zooming is disposed to be movable between a first lens group 51 and the light control device 23 along the optical path.

An ultraviolet cut-off filter 65 is applied to the entire surface of the rearmost lens of the second lens group so as to cover the effective optical path 20. However, the ultraviolet cut-off filter 65 may be disposed at any position on the first lens group side of the GH cell 12 on the effective optical path. Namely, the ultraviolet cut-off filter 65 may be disposed at any desired position between the first lens group 51 and the liquid ND device (the GH cell 12) shown in FIG. 1.

The ultraviolet cut-off filter 65 generally comprises one selected from $SiO_2$, $TiO_2$ and $Al_2O_3$, or a multilayer structure of at least two of these materials. For example, 40 to 60 films each having a thickness of 100 Å or less per layer may be laminated.

In the light control device 23 of this embodiment, the ultraviolet cut-off filter 65 is disposed at the rearmost position the lens group, but the light control device 23 may be integrally bonded to the incidence surface of the liquid crystal element, or may be formed as a separate unit. These devices are known generically as the light control device. The light control device may be referred to as a "light control system" or "light control mechanism".

In this embodiment, ultraviolet cut-off coated glass, ultraviolet absorbing glass, an ultraviolet cut-off coat, or the like may be used in place of the ultraviolet cut-off filter 65.

The number of ultraviolet cut-off coats varies with changes in the number of lenses according to the construction of the device. However, when the number of lenses is n, the ultraviolet cut-off coats can be applied to 2n surfaces or less because each lens has at least two surfaces.

The ultraviolet cut-off filter may be disposed at any position on the light incidence side of the liquid crystal element as long as at least the effective optical path can be covered. However, as shown in FIG. 1, the ultraviolet cut-off filter is preferably disposed, for example, at the rearmost position of the second lens group (for zooming) 52 because the area of mounting is minimized, and a useless portion does not occur.

The mounting position is preferably as near the liquid crystal element as possible because the ultraviolet cutting-off ability can be effectively used. In this case, the ultraviolet absorbing effect of the lens groups 51 and 52 is added to the ultraviolet cutting-off effect of the ultraviolet cut-off filter 65.

Also, the thickness, the material, and the shape of the ultraviolet cut-off filter may be freely changed as long as the area of the ultraviolet cut-off filter overlaps with at least the sectional area of the effective optical path, and the same as or larger than the sectional area.

Furthermore, the ultraviolet cut-off filter may be mounted in such a matter that it can be taken in and out of the effective optical path. Other methods of mounting the ultraviolet cut-off filter include a method in which an ultraviolet absorber is previously contained in a lens, a method in which an ultraviolet absorber is applied to the surface of a lens, a method in which an ultraviolet absorber is provided separately from a lens, and the like.

Furthermore, in the light control device and the imaging device of this embodiment, a negative liquid crystal molecule having negative anisotropy of dielectric constant is used as a host material of the guest-host liquid crystal element, and a guest material comprises a positive or negative dichroic dye molecule.

The polarizer is preferably provided on a movable portion of a mechanical iris so that it can be taken in and out of the effective optical path.

In this embodiment, the ultraviolet cut-off filter is used for protecting the liquid crystal composition in the liquid crystal element, and thus the ultraviolet cut-off filter may be provided at any position on the light incidence side of the liquid crystal element on the effective optical path.

In this embodiment, an ultraviolet absorbing material is provided on the light incidence side of the guest-host liquid crystal element, and thus the quantity of ultraviolet rays applied to the guest-host liquid crystal element is significantly decreased.

Therefore, the dichroic dye molecule in the guest-host liquid crystal element is neither optically decomposed nor deteriorated by ultraviolet rays, and thus the light absorbing function basically possessed by the molecule can be sufficiently maintained, thereby stabilizing the light absorbing effect of the guest-host liquid crystal element and improving the drive efficiency.

Also, deterioration of the liquid crystal composition can be decreased to improve the drive reliability of the entire liquid crystal element.

Figure 15A:
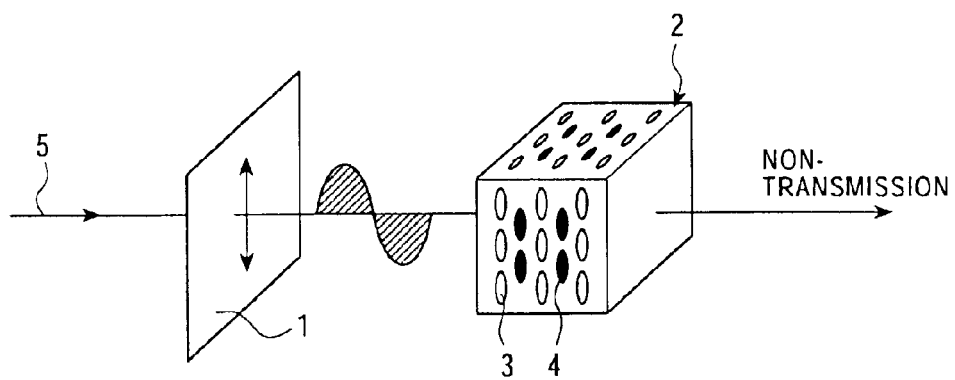
FIGS. 15A and 15B are schematic drawings each showing the principle of operation of a conventional light control device.
Figure 15B:
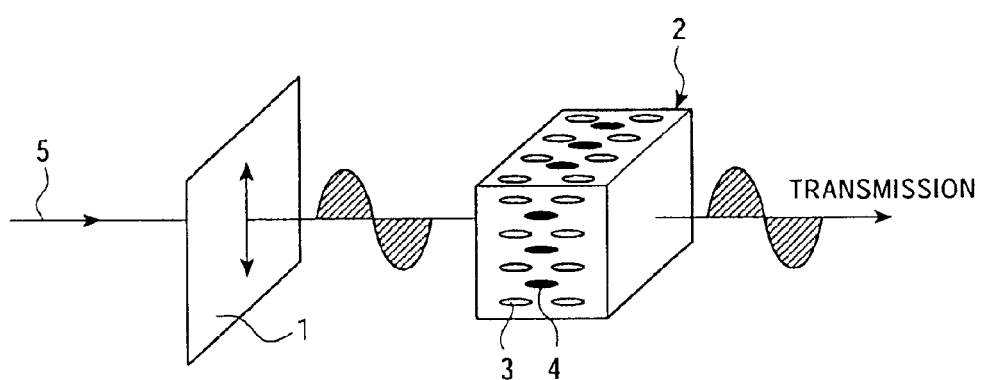
Figure 16:
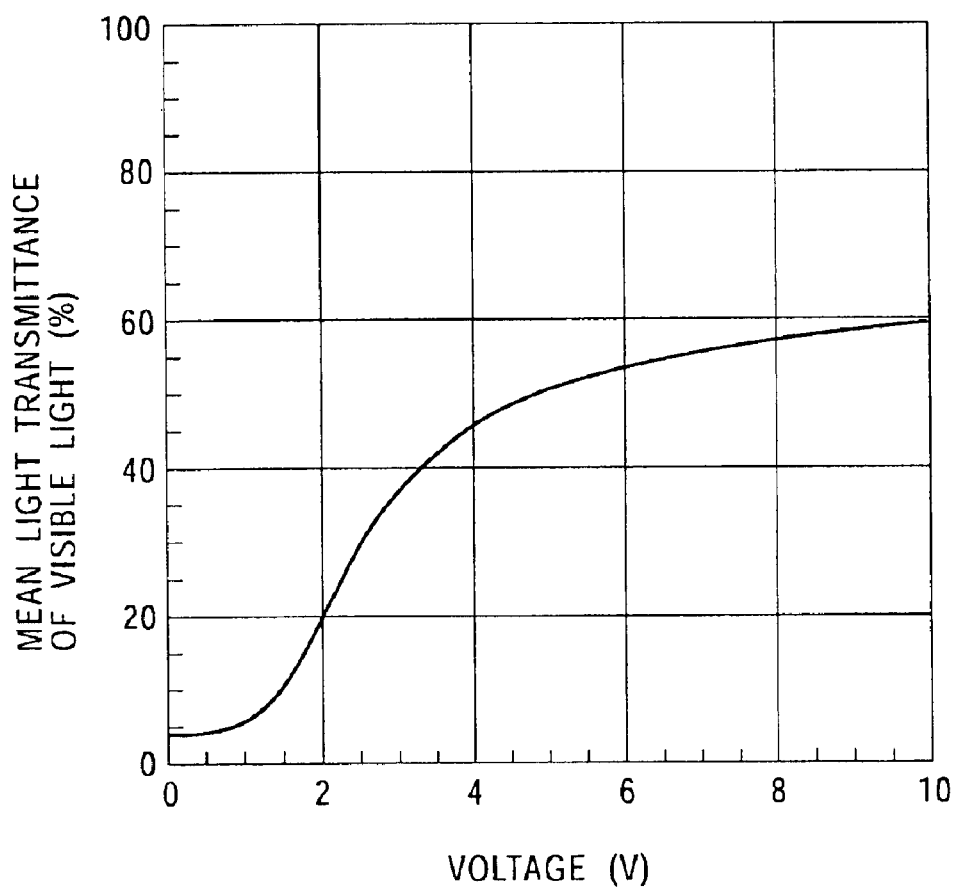
FIG. 16 is a graph showing the relation between the light transmittance and the applied driving voltage of the conventional light control device.

Next, in the guest-host liquid crystal cell (GH cell) 2 shown in FIGS. 15A and 15B in which a positive liquid crystal having positive anisotropy (Δε) of dielectric constant is used as the host material, and a positive dye having dichroism and positive anisotropy (ΔA) of light absorption is used as the guest material, the polarizer 1 is disposed on the incidence side of the GH cell 2 to measure changes in light transmittance with a square driving waveform applied as an operating voltage. As a result, as shown in FIG. 16, the mean light transmittance of visible light (based on the transmittance (=100%) in the air when a polarizer is added to a liquid crystal cell; this applies to the description below) increases with application of the operating voltage. However, when the voltage is increased to 10 V, the maximum light transmittance is about 60%, and the light transmittance changes slowly.

This is possibly because in the positive host material, the interaction of the liquid crystal molecule at the interface with the liquid crystal orientation film of the liquid crystal cell is strong with no voltage applied, and even when the voltage is applied, the liquid crystal molecule in which the director is not changed (or less changed) remains.

Figure 7:
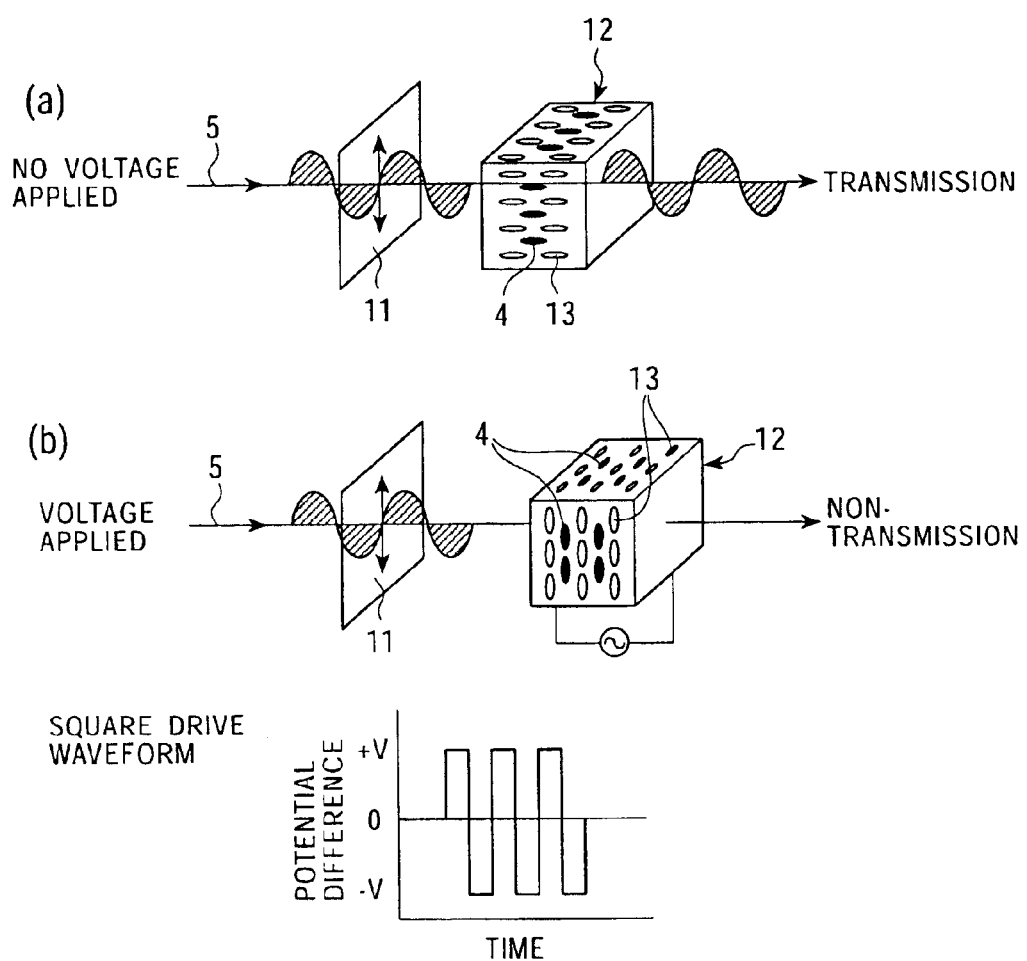
FIG. 7 is a schematic drawing showing the principle of operation of an example of a light control device according to an embodiment of the present invention.
Figure 8:
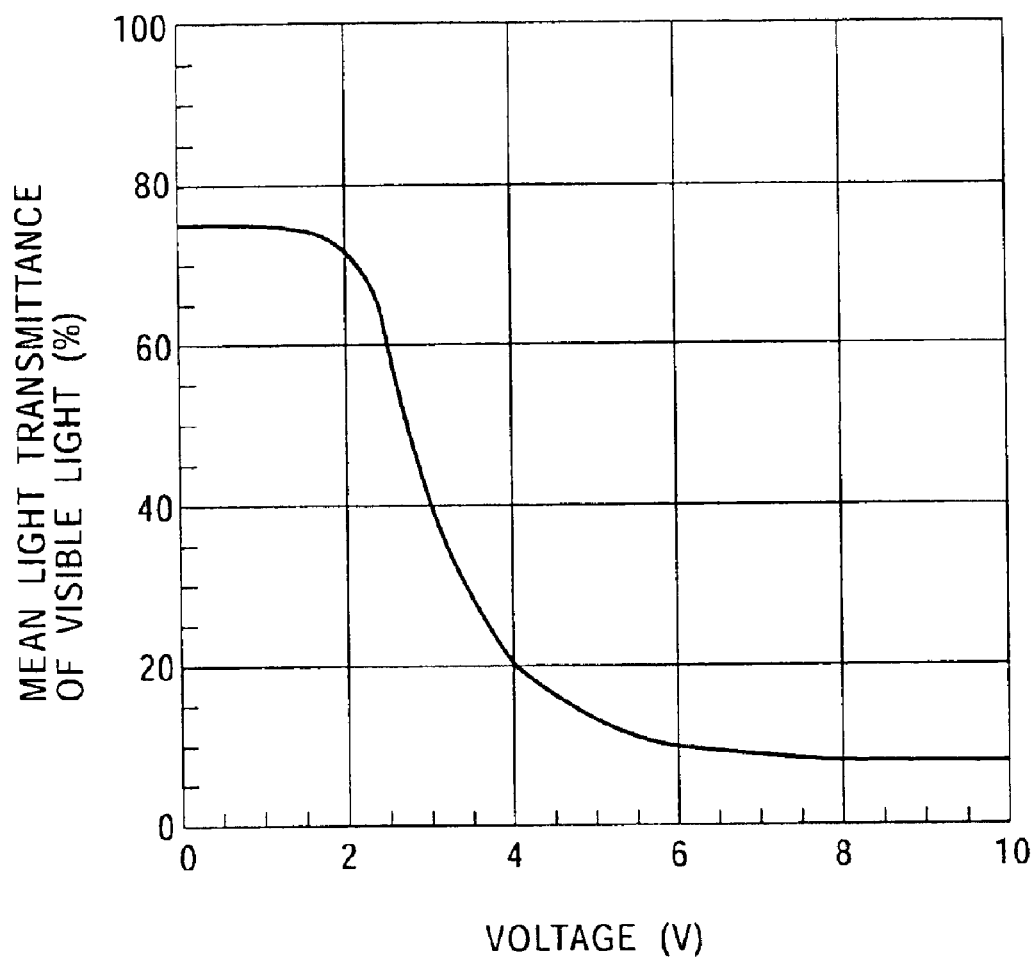
FIG. 8 is a graph showing the relation between the light transmittance and the applied driving voltage of the light control device.

On the other hand, as shown in FIG. 7, a guest-host liquid crystal cell (GH cell) 12 is the same as the GH cell 2 shown in FIGS. 15A and 15B except that a negative liquid crystal having negative anisotrophy (Δε) of dielectric constant, for example, MCL-6608 produced by Merck Co., Ltd., is used as the host material, and a positive dye having dichroism, for example, D5 produced by BDH Co., Ltd., is used as the guest material. In the GH cell 12, the polarizer 11 is disposed on the incidence side of the GH cell 12 to measure changes in light transmittance with a square driving waveform applied as the operating voltage. As a result, as shown in FIG. 8, the mean light transmittance (in the air) of visible light decreases from the maximum light transmittance of about 75% to several % with application of the operating voltage, and the light transmittance changes relatively rapidly.

This is possibly because in the use of the negative host material, light is easily transmitted because of the very weak interaction of the liquid crystal molecule at the interface with the liquid crystal orientation film of the liquid crystal cell with no voltage applied, and the direction of the director of the liquid crystal easily changes with the voltage applied.

In this GH cell using the negative host material, light transmittance (particularly, in a transparent cell) is improved to permit realization of a compact light control device in which the GH cell can be positioned and used in an imaging optical system. In this case, by providing the polarizer in the optical path of light incident on the liquid crystal element, the ratio of the absorbance (i.e., the optical density ratio) with no voltage applied to the absorbance with the voltage applied is further improved to further increase the contrast ratio of the light control device, thereby permitting a normal control operation in both a bright place and a dark place.

In this embodiment, the negative liquid crystal of the liquid crystal element preferably has negative anisotropy of dielectric constant. However, the guest material may comprise a positive or negative dichroic dye molecule. The host material is preferably negative, but it may be positive.

In this embodiment, the negative (or positive) host material, and the positive (or negative) guest material can be selected from known materials. However, in actual use, these materials are selected so as to exhibit a nematic property in the actual operating temperature range, and a blend composition may be used.

Figure 9:
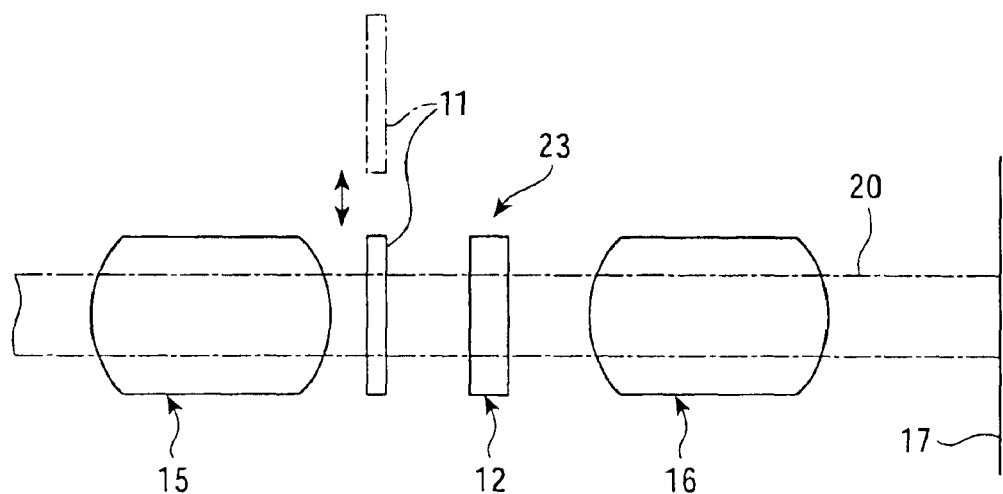
FIG. 9 is a schematic side view of the light control device using a liquid crystal optical element.

The light control device 23 comprising the GH cell 12 is disposed between the front lens group 15 and the rear lens group 16 each comprising a plurality of lenses as a zoom lens, for example, as shown in FIG. 9. In this case, light transmitted through the front lens group 15 is linearly polarized by the polarizer 11, and then incident on the GH cell 12. The light transmitted through the GH cell 12 is converged by the rear lens group 16 and projected as an image on an image plane 17.

The polarizer 11 constituting the light control device 23 can be taken in and out of the effective optical path 20 of light incident on the GH cell 12. Specifically, when the polarizer 11 is moved to the position shown by a virtual line, the polarizer 11 can be removed from the effective optical path 20 of light. As a means for taking the polarizer 11 in and out, such a mechanical iris as shown in FIG. 10 may be used.

The mechanical iris is a mechanical diaphragm device used for a digital still camera, a video camera, and the like, and mainly comprises two iris blades 18 and 19, and the polarizer 11 attached to the iris blade 18. The iris blades 18 and 19 can be vertically moved. The iris blades 18 and 19 are relatively moved in the directions shown by arrows 21 by using a driving motor not shown in the drawing.

Figure 10:
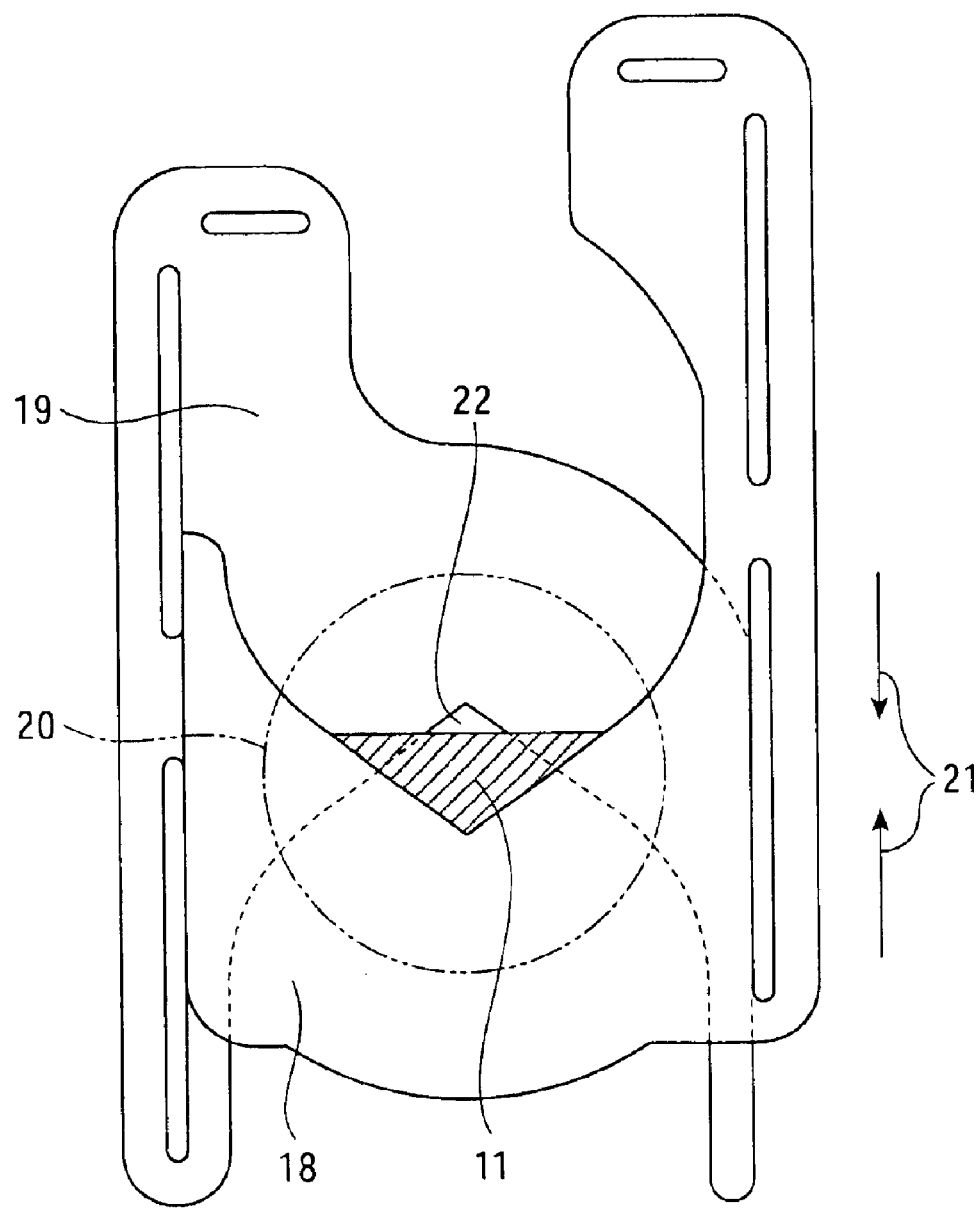
FIG. 10 is a front view of a mechanical iris of the light control device.

As shown in FIG. 10, the iris blades 18 and 19 are partially overlapped with each other. With a large overlap, an opening 22 positioned near the center between the iris blades 18 and 19 on the effective optical path 20 is covered with the polarizer 11.

Figure 11A:
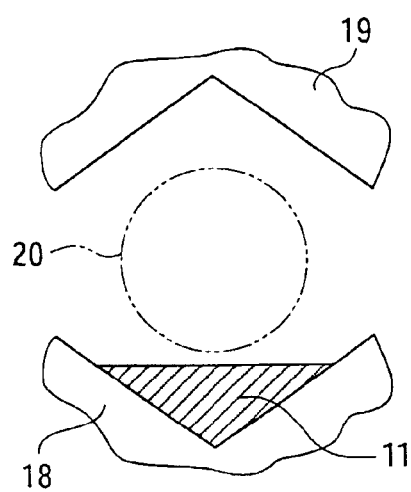
FIGS. 11A to 11C are enlarged schematic partial views showing the operations of the mechanical iris near the effective optical path of the light control device.
Figure 11B:
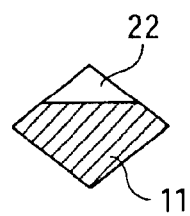
Figure 11C:
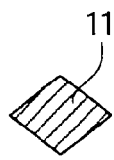

FIGS. 11A to 11C are enlarged partial views of the mechanical iris near the effective optical path 20. When the iris blade 18 is moved downwardly, the iris blade 19 is moved upwardly at the same time as the iris blade 18. At the same time, as shown in FIG. 11A, the polarizer 11 attached to the iris blade 18 is also moved to the outside of the effective optical path 20. Conversely, when the iris blade 18 and the iris blade 19 are moved upwardly and downwardly, respectively, the iris blades are overlapped with each other. As the same time, as shown in FIG. 11B, the polarizer 11 is moved onto the effective optical path 20 to gradually cover the opening 22. As the overlap between the iris blades 18 and 19 increases, the polarizer 11 completely covers the opening 22, as shown in FIG. 11C.

Next, a description will be made of a light control operation of the light control device 23 using the mechanical iris.

As an object not shown in the drawing becomes bright, the iris blades 18 and 19 separated in the vertical direction are driven to overlap with each other by the motor not shown in the drawing. Consequently, the polarizer 11 attached to the iris blade 18 starts to enter the effective optical path 20 to partially cover the opening 22 (FIG. 11B).

At this time, the GH cell 12 is in a state in which light is not absorbed, (but, light is slightly absorbed by the GH cell 12 due to thermal fluctuation or surface refection). Therefore, the strength distribution of light transmitted through the polarizer 11 is substantially the same as that of light transmitted through the opening 22.

Then, the polarizer 11 is put in a state in which the opening 22 is completely covered (FIG. 11C). When the brightness of the object further increases, the voltage applied to the GH cell 12 is increased so that light is absorbed by the GH cell 12 in order to control light.

Conversely, when the object becomes dark, first, the voltage applied to the GH cell 12 is decreased or no voltage is applied to the GH cell 12 to eliminate the light absorbing effect of the GH cell 12. When the object becomes further dark, the motor not shown in the drawings is driven to move the iris blade 18 downwardly or the iris blade 19 upwardly. As a result, the polarizer 11 is moved to the outside of the effective optical path 20 (FIG. 11A).

As shown in FIGS., 9, 10 and 11A to 11C, the polarizer 11 (transmittance of 40% to 50%, for example) can be moved to the outside of the effective optical path 20, and thus light absorption by the polarizer 11 can be prevented. Therefore, the maximum transmittance of the light control device can be increased to, for example, two times or more. Specifically, the maximum transmittance of the light control device is, for example, about 2 times as high as that of a conventional light control device comprising a fixed polarizer and a GH cell. The minimum transmittances of both devices are the same.

Since the polarizer 11 can be moved by using the mechanical iris which is put into practical use for a digital still camera or the like, the light control device can easily be realized. The use of the GH cell 12 permits light control by absorption by the GH cell 12 as the same time as light control by the polarizer 11.

Therefore, the light control device can increase the light/dark contrast ratio and maintain a quantity distribution of light substantially uniform.

Next, the configuration of a light control device using a guest-host liquid crystal (GH) cell will be described.

As shown in FIG. 9, the light control device comprises the GH cell 12 and the polarizer 11. The GH cell 12 comprises two glass substrates (not shown) on each of which a transparent electrode and an alignment film are formed, and a mixture of a negative liquid crystal molecule (host material) and a positive or negative dichroic dye molecule (guest material), the mixture being sealed between the two glass substrates.

A negative liquid crystal having negative anisotropy of dielectric constant, for example, MLC-6608 produced by Merck Co., Ltd., is used as an example of the liquid crystal molecule, and a positive dye having anisotropy of light absorption and absorbing light in the molecular long-axis direction, for example, D5 produced by BDH Co., Ltd., is used as an example of the dichroic dye molecule 4. The light absorption axis of the polarizer 11 is perpendicular to the light absorption axis with the voltage applied to the GH cell 12.

For example, as shown in FIG. 9, the light control device 23 comprising the GH cell 12 is disposed between the front lens group 15 and the rear lens group 16 each comprising a plurality of lenses like a zoom lens. Light transmitted through the front lens group 15 is linearly polarized by the polarizer 11, and then incident on the GH cell 12. Light transmitted through the GH cell 12 is converged by the rear lens group 16, and projected as an image on the image plane 17.

As described above, the polarizer 11 constituting the light control device 23 can be taken in and out of the effective optical path 20 of light incident on the GH cell 12.

Specifically, the polarizer 11 can be moved to the outside of the effective optical path 20 by moving the polarizer 11 to the position shown by a virtual line. As a means for moving the polarizer 11, the mechanical iris shown in FIG. 10 may be used.

FIG. 1 shows an example in which the light control device 23 of this embodiment is incorporated into a CCD camera.

Namely, in the CCD camera 50, the first lens group 51 and the second lens group (zooming lens) 52 corresponding to the front lens group 15, the ultraviolet cut-off filter 65, the iris blade 18, the light control device 23, the third lens group 53 and the fourth lens group (for focusing) 54 corresponding to the rear lens group 16, and the CCD package 55 are disposed in order with appropriate intervals along the optical axis shown by a one-dot chain line. The infrared cut-off filter 55a, the optical low-pass filter system 55b and the CCD imaging element 55c are contained in the CCD package 55.

Furthermore, the light control device 23 comprising the GH cell 12 and the polarizer 11 is mounted near the third lens group 53 between the second lens group 52 and the third lens group 53 on the same optical path in order to control the quantity of light (decrease the quantity of light). The fourth lens group 54 for focusing is disposed to be movable between the third lens group 53 and the CCD package 55 along by optical path by the linear motor 57. The second lens group 52 for zooming is disposed to be movable between the first lens group 51 and the light control device 23 along the optical path.

In FIG. 1, the ultraviolet cut-off filter 65 is disposed at the rearmost position of the second lens group for the sake of convenience. However, the ultraviolet cut-off filter 65 may be mounted at any position on the first lens group side of the GH cell 12 on the effective optical path.

Figure 12:
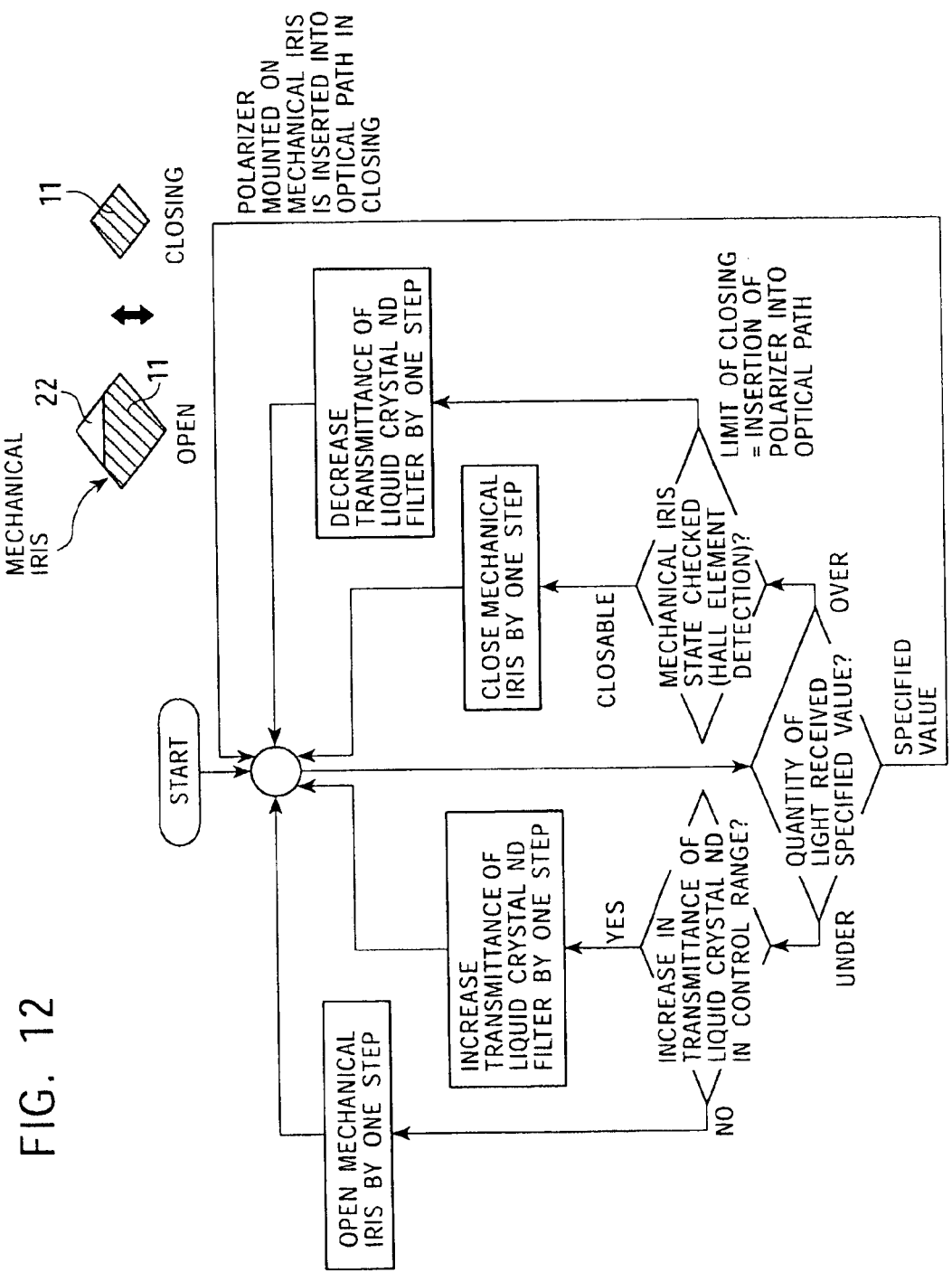
FIG. 12 shows the algorithm of light transmittance control in a camera system.

FIG. 12 shows the sequence algorithm of light transmittance control by the light control device 23 in the camera system.

In this embodiment, the light control device 23 based on the present invention is provided between the second lens group 52 and the third lens group 53, and thus the quantity of light can be controlled by applying a voltage as described above, thereby permitting miniaturization of the system to a size within the effective range of the optical path. Therefore, miniaturization of the CCD camera can be realized. Also, the quantity of light can be appropriately controlled by controlling the voltage applied to an electrode pattern, and unlike a conventional CCD camera, a diffraction phenomenon can thus be prevented. Therefore, a sufficient amount of light can be incident on the imaging element to avoid blurring of an image.

Figure 2:
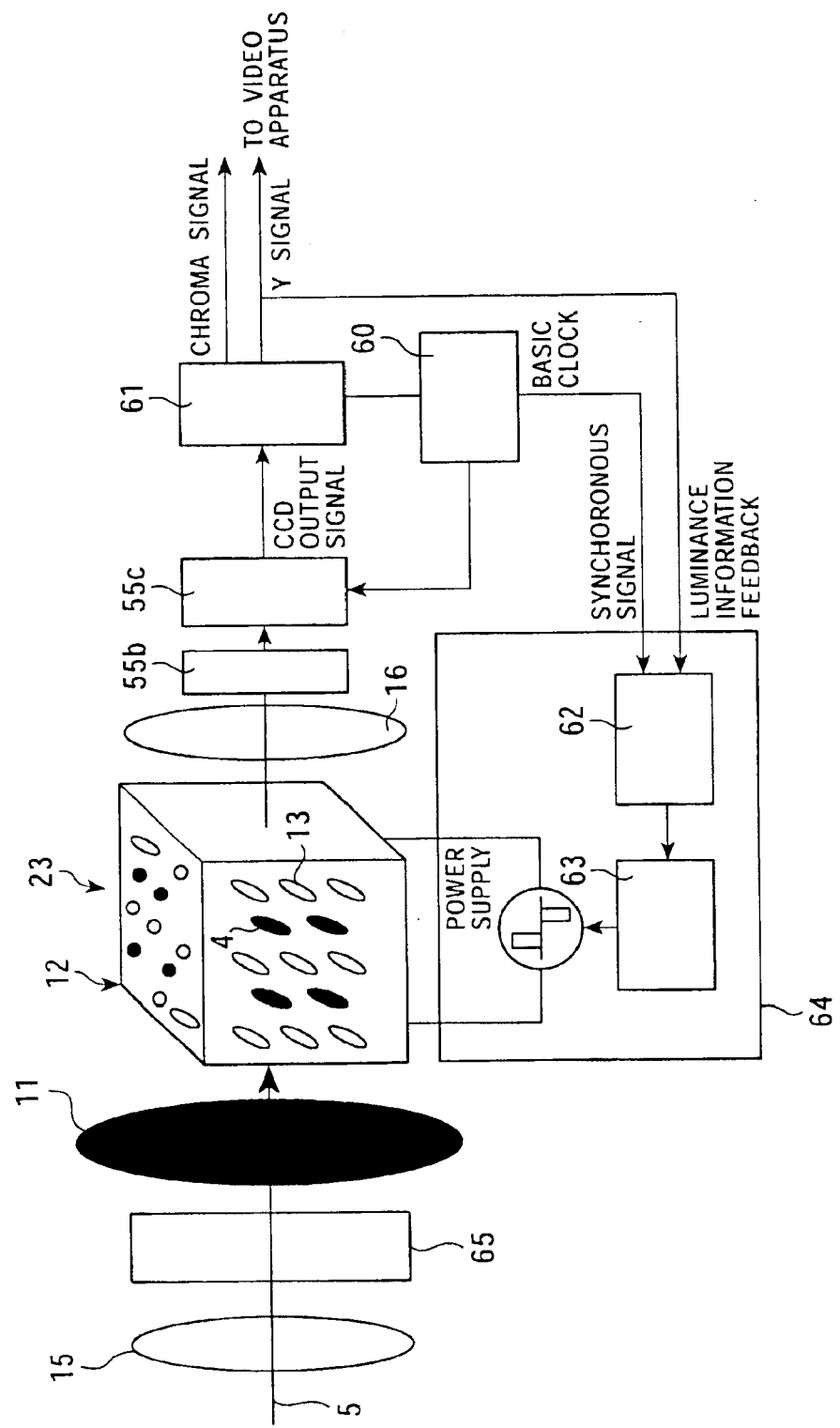
FIG. 2 is a block diagram of the camera system including a driving circuit.

FIG. 2 is a block diagram of the driving circuit of the CCD camera. Referring to FIG. 2, a CCD driving circuit section 60 of the CCD imaging element 55c disposed on the light emission side of the light control device 23 is provided for processing an output signal of the CCD imaging element 55c by a Y/C signal processing section 61, and feeding back the output signal as luminance information (Y signal) to a GH cell driving control circuit section 62. As described above, a pulse voltage or driving pulse with a controlled pulse width can be obtained from a pulse generating circuit section 63 based on a control signal from the GH cell driving control circuit section 62 in synchronism with a basic clock output from the CCD driving circuit section 60. A GH liquid crystal driving control mechanism 64 for controlling the pulse voltage or the pulse width comprises the GH cell driving control circuit section 62 and the pulse generating circuit section 63.

Even in a system other than the camera system, light emitted from the light control device 23 is received by a photodetector (or photomultiplier), and luminance information of the emitted light is fed back to the GH cell driving control circuit section 62 from the photodetector, so that the driving pulse with a controlled pulse voltage can be obtained from the pulse generating circuit section in synchronism with the clock of a GH cell driving circuit section (not shown).

Figure 13:
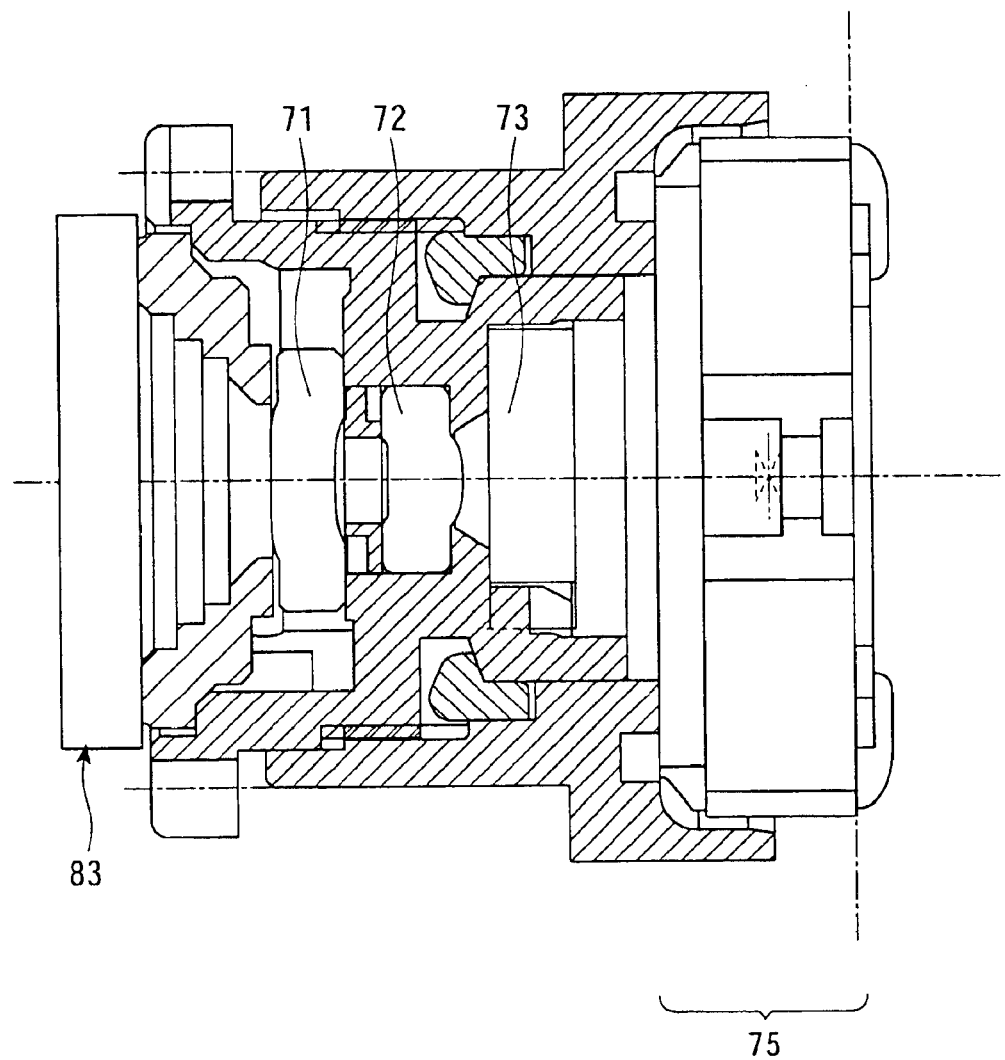
FIG. 13 is a schematic sectional view of an imaging device in which a light quantity control device (light control device) is incorporated according an embodiment of the present invention.
Figure 14:
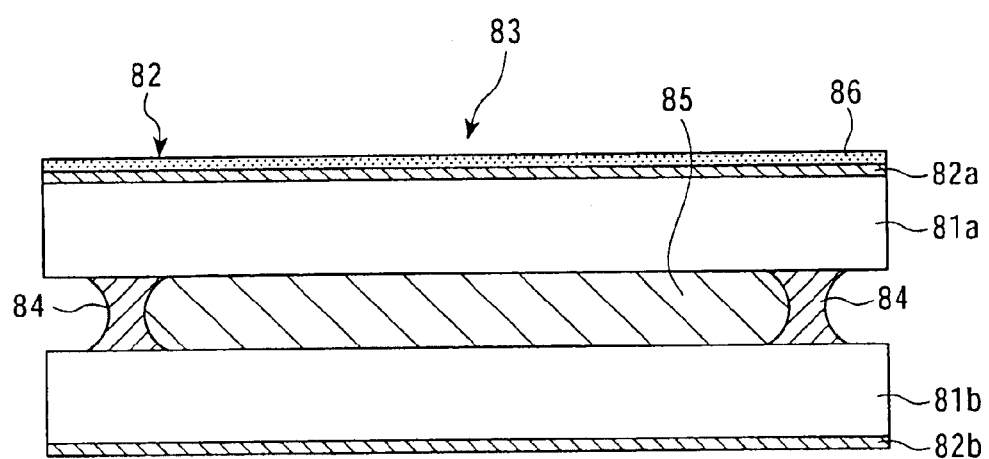
FIG. 14 is a schematic sectional view of the light quantity control device.

In the structure of the imaging system, for example, in a single-focus lens system, the light control element cannot be easily disposed in a lens group. For example, as shown in FIG. 13, when a pair of lenses 71 and 72, and an infrared cut-off filter 73 are disposed on the light incidence side of a solid-state imaging element (CCD) 75, and a light quantity control device 83 having the same construction as the above-described light control device is further disposed to be exposed from the outermost side on the light incidence side, a liquid crystal element is exposed to incident light. However, as shown in FIG. 14 showing a principal portion, a UV (ultraviolet) absorbing film 86 (or ultraviolet reflecting film) is formed on the light incidence surface of a GH cell 82, for protecting a liquid crystal 85.

Like in the GH cell 12, in the GH cell 82, the liquid crystal layer 85 comprising a negative liquid crystal and a positive dichroic dye is sealed between substrates 81a and 81b each having a transparent electrode, and a spacer (serving as a seal) material 84 is provided around the liquid crystal 85. Furthermore, anti-reflection films 82a and 82b are provided on the outer surfaces of the substrates 81a and 81b, respectively, for preventing reflection of necessary light, and an ultraviolet absorbing film (or ultraviolet reflecting film) 86 is provided on the light incidence side.

Therefore, ultraviolet rays of incident light are absorbed or reflected, and can thus be prevented from being incident on the liquid crystal layer 85, thereby preventing deterioration of the component material, particularly, the dye molecule, of the liquid crystal layer 85. In this case, even if the space of a casing is so narrow that the light control element cannot be disposed in the casing, a sufficient ultraviolet absorbing or reflecting effect can be obtained from the ultraviolet absorbing film (or reflecting film) 86 of the light quantity control device 83.

The ultraviolet absorbing film (or reflecting film) 86 may be formed by either a wet method or a dry method. Examples of the wet method include a method of coating a surface coating agent containing an ultraviolet absorber, and examples of the dry method include a multilayer deposition method, a CVD (Chemical vapor deposition) method, and the like.

When the quantity control device 83 is disposed outside the casing, as shown in the drawing, the same ultraviolet absorbing or reflecting film is preferably formed on the side surfaces of the device by coating.

The above-described light control device preferably uses a liquid crystal element such as a guest-host liquid crystal element. However, either a positive material or a negative material, which has positive or negative anisotropy of dielectric constant, may be used as the host material, and either a positive or negative dichroic dye molecule may be used as a coloring material.

Preferred examples of the present invention will be described below with reference to the drawings.

The above-described liquid crystal element (GH cell 12) was subjected to a fading test (ultraviolet irradiation test) using a xenon lamp. For comparison, the liquid crystal element was irradiated with ultraviolet rays for a desired time by using the xenon lamp under a condition in which an ultraviolet cut-off film was provided on the light incidence side on the effective optical path, and a condition in which the ultraviolet cut-off film was not used.

Figure 3:
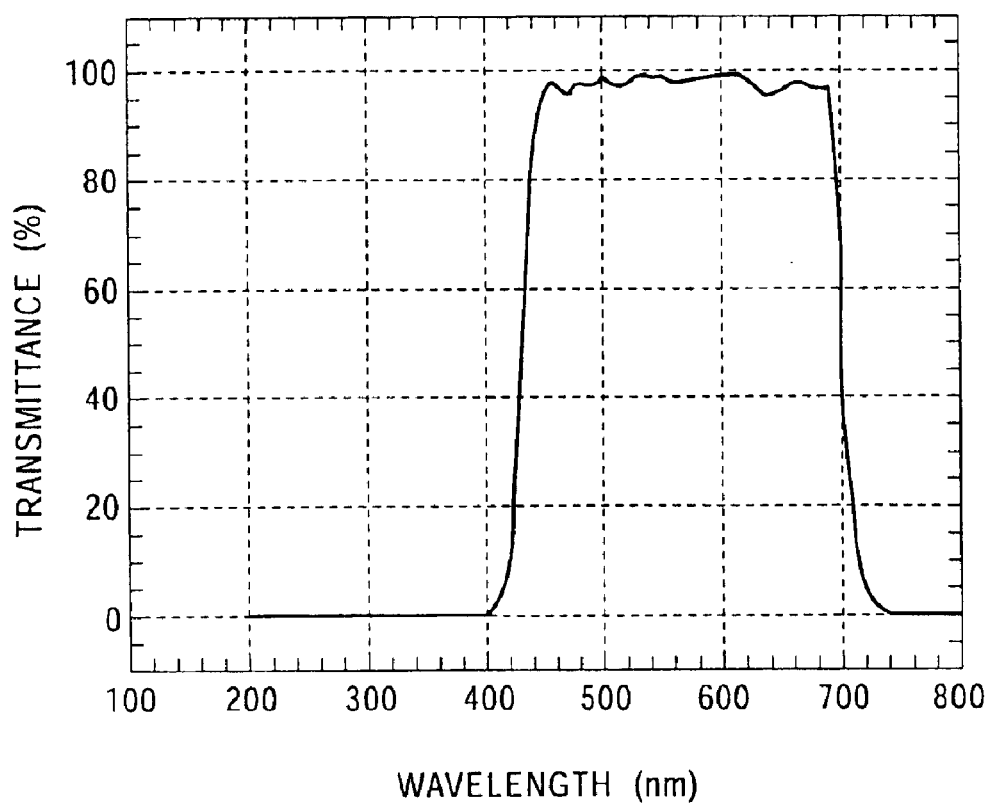
FIG. 3 a drawing showing an example of spectral characteristics of an ultraviolet cut-off filter in an example of the present invention.

FIG. 3 shows the spectral characteristics of the ultraviolet cut-off film used.

The ultraviolet cut-off film having the following specifications was used. The ultraviolet cut-off film comprised a structure in which three layers of $SiO_2$, $TiO_2$ and $Al_2O_3$ were laminated 16 times. The thickness per layer was 100 Å, and thus the total thickness was 100 Å×48 layers=4800 Å. With respect to the mounting position and method of the cut-off film, the cut-off film was disposed on the light incidence side of the GH cell without bonding or the like because the cut-off film was used for the fading test.

After ultraviolet irradiation, the relation between the applied voltage and light absorbance of each of the two samples was measured, and graphed. The results are shown in FIG. 4.

Figure 4:
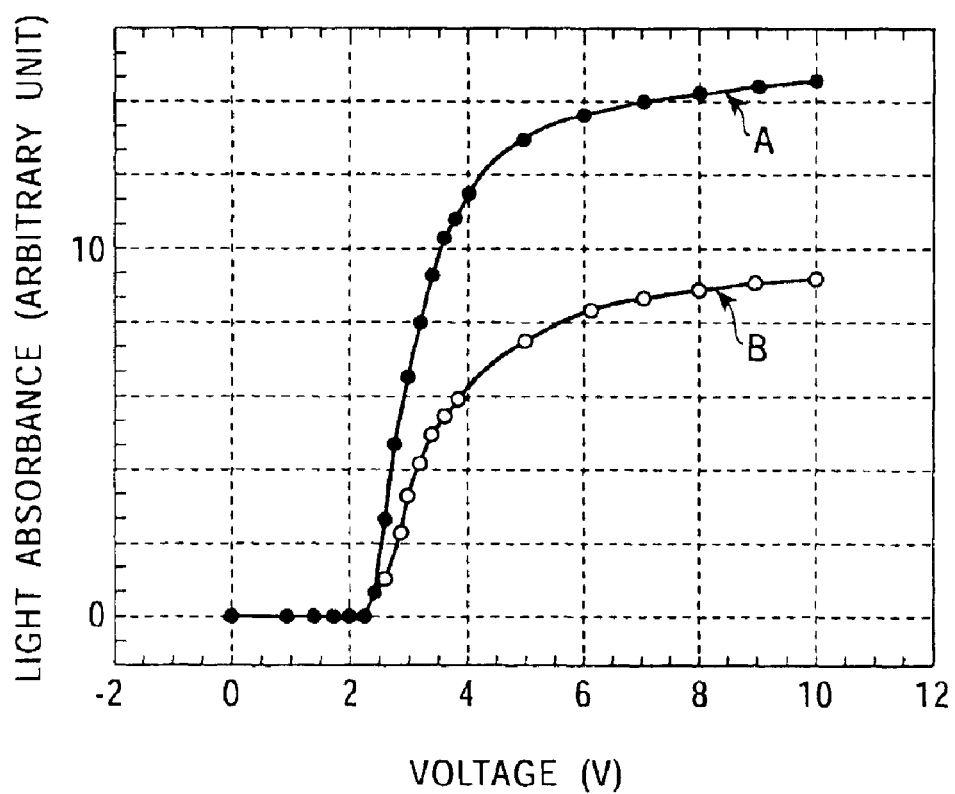
FIG. 4 is a graph showing the relation between the light absorbance and the applied voltage of the light control device.

As can be seen from a graph of FIG. 4, when the ultraviolet cut-off film was used (A), the light absorbance rapidly increased from 0 to about 11.5 in arbitrary units as the applied voltage increased from 2 V to 4 V, and when the applied voltage was finally increased to 10 V, the light absorbance was about 14.5 in arbitrary units.

However, when the ultraviolet cut-off filter was not used (B), the light absorbance gradually increased from 0 to about 6 in arbitrary units as the applied voltage increased from 2 V to 4 V, and even when the applied voltage was finally increased to 10 V, the light absorbance was only about 9 in arbitrary units.

These results indicate that the light absorbing effect of the sample (B) not using the ultraviolet cut-off film is significantly lower than that of the sample (A) using the ultraviolet cut-off film. It is thus understood that the physical properties of the liquid crystal composition are changed to some extent by ultraviolet irradiation.

Figure 5:
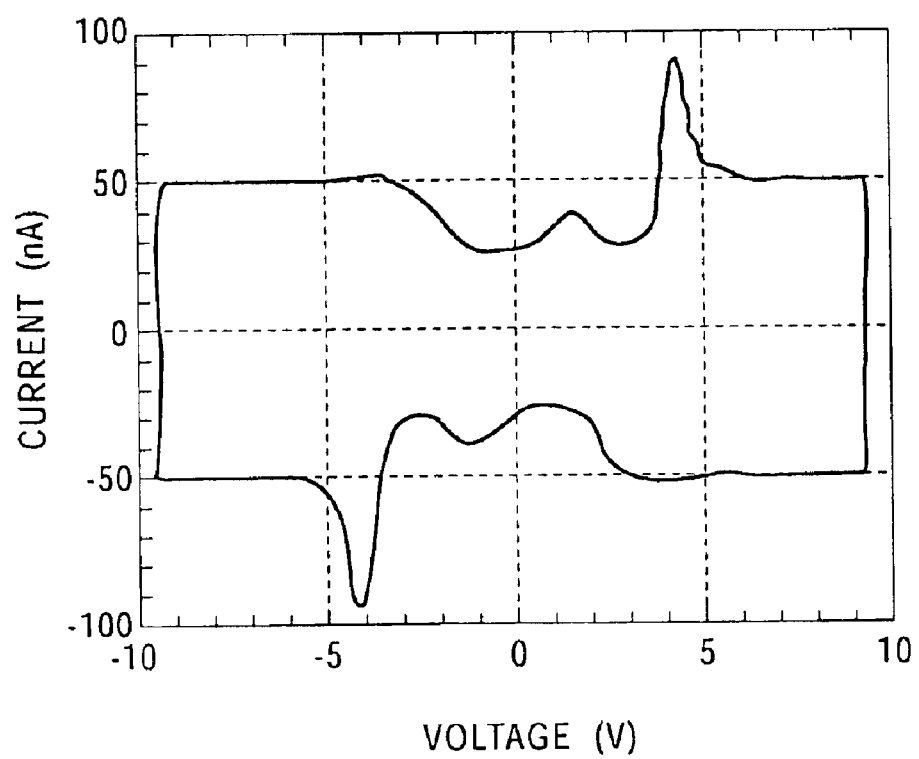
FIG. 5 is a graph showing the relation between the applied voltage and the current in the use of the ultraviolet cut-off filter.
Figure 6:
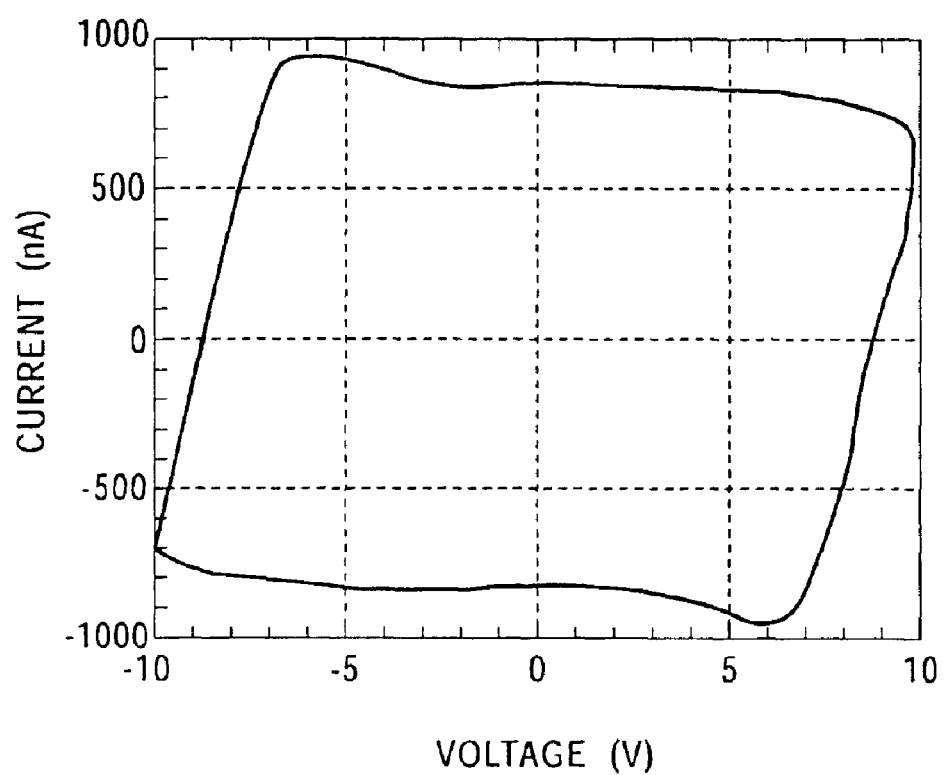
FIG. 6 is a graph showing the relation between the applied voltage and the current in a conventional example in which an ultraviolet cut-off filter is not used.

With respect to the effect of the ultraviolet cut-off filter, a comparison between the two samples was studied by measuring changes in the ion content of the liquid crystal composition. The ion content was measured by a variable current measuring method (K. Ono et at.; Jpn. J. Appl. Phys., 30, 1991, 2832). The results obtained by using the ultraviolet cut-off film are shown in a graph of FIG. 5, and the results obtained without using the ultraviolet cut-off film are shown in a graph of FIG. 6.

In these graphs, in the use of the ultraviolet cut-off film, the current is a value of 50 nA or −50 nA except at the time of polarity reversal when the voltage is changed from about 10V to about −10V (or from about −10V to about 10V), and the current is relatively stable.

This is possibly because the dichroic dye molecule in the GH cell 12 is not irradiated with ultraviolet rays, and is neither optically decomposed nor deteriorated.

On the other hand, without the ultraviolet cut-off film, the current is a value of as large as about 1000 nA or −1000 nA when the voltage is changed from about 10V to about −10V (or from about −10V to about 10V), and the change curve is unstable and distorted as a whole.

This is possibly because the dichroic dye molecule in the GH cell 12 is ionized by optical decomposition or optical deterioration due to ultraviolet irradiation to increase the ion content.

Therefore, in the system not using the ultraviolet cut-off film, the ion content is significantly increased by ultraviolet irradiation, and thus deterioration in reliability of the liquid crystal element can be recognized.

These results indicate that when the ultraviolet cut-off film serving as the ultraviolet cut-off filter based on the present invention is disposed on the light incidence side of the liquid crystal element, deterioration in the liquid crystal composition can be decreased to improve the reliability of the whole liquid crystal element.

Next, in the GH cell 82 having the same construction as the GH cell 12, three layers of $SiO_2$, $TiO_2$ and $Al_2O_3$ were laminated 16 times to obtain a layer having a thickness of about 50 nm on a glass substrate of the liquid crystal cell. The resultant ultraviolet absorbing film 86 had an absorption property, for example, for a wavelength of 395 nm (transmittance 0%) to a wavelength of 440 nm (transmittance 100%) (or a reflecting film comprising an ultraviolet reflecting agent and having a thickness of 5 to 100 nm had a reflection property, for example, for a wavelength of 395 nm (reflectance 0%) to a wavelength of 440 nm (reflectance 100%)). In a case in which the film 86 was provided, and a case in which the film 86 was not provided, ultraviolet irradiation was performed for examining the performance with respect to deterioration in the cell. As a result, the results shown in the table below were obtained.

| Liquid crystal cell | Dielectric anisotropy of liquid crystal (Δε) | Performace after exposure to ultraviolet rays |
| --- | --- | --- |
| Without ultraviolet absorbing film (or reflecting film) | Positive | Deteriorated* |
| Without ultraviolet | Negative | Deteriorated* |

-continued

| Liquid crystal cell | Dielectric anisotropy of liquid crystal (Δε) | Performace after exposure to ultraviolet rays |
| --- | --- | --- |
| absorbing film (or reflecting film) | | |
| With ultraviolet absorbing film (or reflecting film) | Positive | Not deteriorated** |
| With ultraviolet absorbing film (or reflecting film) | Negative | Not deteriorated** |

*Deteriorated: A change was observed in spectral characteristics (comparison of the characteristics before and after the test).
**Not deteriorated: No change was observed in spectral characteristics (comparison of the characteristics before and after the test).

It is recognized from these results that the material is deteriorated by exposure to ultraviolet rays regardless of the dielectric anisotropy of the liquid crystal, but the material is not deteriorated by exposure to ultraviolet rays when the ultraviolet absorbing film (or reflecting film) is provided.

Although the embodiment and examples of the present invention are described above, various changes can be made based on the technical idea of the present invention.

For example, the structure and materials of the liquid crystal element and the light control device, and the configurations of the driving mechanism, the driving circuit and the control circuit can be variously changed. As the driving waveform, any one of a square wave, a trapezoidal wave, a triangular wave, and a sine wave can be used for driving, and the inclination of a liquid crystal molecule changes according to the potential difference between two electrodes to control light transmittance.

The light control device and the imaging device of the present invention are suitable for cases in which a driving electrode of the liquid crystal optical element is formed over the entire region of at least an effective transmitting portion. The light transmittance can be simultaneously controlled, with high precision, over the entire width of the effective optical path by controlling the driving pulse applied to the driving electrode formed as described above.

Besides the above-described GH cell, a two-layer structure GH cell or the like can also be used. Although, in the above embodiments, the position of the polarizer 11 relative to the GH cell 12 is between the front lens group 15 and the rear lens group 16, the position is not limited to this, and the polarizer 11 may be disposed at any position optimum for setting the conditions of an image lens. Namely, the polarizer 11 can be disposed at any desired position on the object side or the imaging element side, for example, at a position between the image plane 17 and the rear lens group 16, unless an optical element comprising a retardation film or the like having a variable polarization state is used. Furthermore, the polarizer 11 may be disposed in front of or behind a single lens used in place of the front lens group 15 or the rear lens group 16.

Also, the number of the iris blades 18 and 19 is not limited to two, and a larger number of iris blades may be used, or a single blade may be used. The iris blades 18 and 19 are overlapped with each other by vertical movement, but the blades may be moved in another direction, and may be closed in the direction from the periphery to the center.

The polarizer 11 is attached to the iris blade 18, but the polarizer 11 may be attached to the iris blade 19.

When the object becomes bright, the polarizer 11 is first moved to control light, and light is then absorbed by the GH cell 12. However, conversely, light absorption by the GH cell 12 may be first performed to control light. In this case, the polarizer 11 is moved to control light after the transmittance of the GH cell 12 is decreased to a predetermined value.

As the means for taking the polarizer 11 in and out of the effective optical path 20, the mechanical iris is used, but the means is not limited to this. For example, a film to which the polarizer 11 is attached may be provided directly on a driving motor so that the polarizer 11 can be moved.

Although, in the above embodiment, the polarizer 11 is moved relative to the effective optical path 20, of course, the polarizer 11 may be fixed in the effective optical path.

The light control device of the present invention can be combined with another known filter material (for example, an organic electrochromic material, a liquid crystal, an electroluminescence material, or the like).

Furthermore, besides the optical diaphragm of the imaging device such as the CCD camera or the like, the light control device of the present invention can be widely used for controlling a quality of light in any of various optical systems such as an electrophotographic copying machine, an optical communication device, etc. Besides the optical diaphragm and the filter, the light control device of the present invention can also be applied to various image display elements for displaying a character and an image.

As the spectral characteristics of an ultraviolet cut-off filter, the spectral characteristics shown in FIG. 3 in which light is cut off in both the ultraviolet region and the infrared region are preferred for simultaneously preventing deterioration due to ultraviolet rays and deterioration due to infrared rays. However, light may be cut off only in the ultraviolet region, and the cut-off wavelength region may be variously changed.

Although the ultraviolet absorbing or reflecting film is deposited on a substrate, a similar absorbing member or reflecting member may be provided on the light incidence side. Either the absorbing film (absorbing material) or the reflecting film (reflecting material) may be provided, or both films may be laminated or disposed in turn.

In the present invention, at least one of a filter material absorbing at least ultraviolet rays and a reflecting material reflecting at least ultraviolet rays is provided on the light incidence side of the guest-host liquid crystal element, and thus the quantity of ultraviolet light applied to the guest-host liquid crystal element is significantly decreased. Therefore, the component material in the guest-host liquid crystal element is neither optically decomposed nor deteriorated by ultraviolet rays, thereby permitting stable drive of the liquid crystal element with high efficiency.

What is claimed is:

1. An imaging device comprising a light control device which comprises a guest-host liquid crystal element for controlling light and which is disposed in an optical path of an imaging system, a polarizer provided in the effective optical path of light incident on the liquid crystal element, and a filter material provided on the light incidence side of the liquid crystal element, for absorbing at least ultraviolet rays; and, wherein the polarizer can be taken in and out of the effective optical path.

2. An imaging device according to claim 1, wherein the filter material comprises at least one selected from an ultraviolet cut-off film, ultraviolet cut-off coated glass and ultraviolet absorbing glass.

3. An imaging device according to claim 1, wherein the filter material is provided in at least the same area as the section of an effective optical path of incident light.

4. An imaging device according to claim 1, wherein the liquid crystal element is a guest-host liquid crystal element comprising a negative or positive liquid crystal as a host material, and a positive or negative dichroic dye as a guest material.

* * * * *